United States Patent [19]

Wiens et al.

[11] Patent Number: 5,808,894
[45] Date of Patent: Sep. 15, 1998

[54] AUTOMATED ORDERING METHOD

[75] Inventors: Timothy A. Wiens, Springfield; Richard A. Burgess, Woodbridge, both of Va.

[73] Assignee: Optipat, Inc., Arlington, Va.

[21] Appl. No.: 329,725

[22] Filed: Oct. 26, 1994

[51] Int. Cl.$^6$ .................................................... G06F 19/00
[52] U.S. Cl. ............................ 364/479.01; 364/479.06
[58] Field of Search .............................. 364/468.1, 478.1, 364/479.1, 401–403, 478.03, 478.04, 478.08, 478.13, 478.14, 478.01, 479.01, 479.02, 479.06; 235/375, 376, 380–382, 382.5, 385

[56] References Cited

U.S. PATENT DOCUMENTS

| | | | |
|---|---|---|---|
| 4,734,858 | 3/1988 | Schlafly | 235/380 |
| 4,984,155 | 1/1991 | Geier et al. | 379/93.12 |
| 5,310,997 | 5/1994 | Roach et al. | 235/375 |
| 5,357,439 | 10/1994 | Matsuzaki et al. | 364/468 |
| 5,418,713 | 5/1995 | Allen | 364/403 |

*Primary Examiner*—Paul P. Gordon
*Assistant Examiner*—Thomas E. Brown
*Attorney, Agent, or Firm*—D'Alessandro & Ritchie

[57] ABSTRACT

A method for automated ordering by a customer at a remote location to a vendor in a central location, comprises the steps of composing an order at the remote location and entering the order into a customer computer; initiating a connection between the customer computer and a vendor computer at the central location across a communications media; transmitting at least the order and customer information identifying the customer to the vendor computer by the customer computer; verifying the order in the vendor computer and transmitting a job number from the vendor computer to the customer computer; comparing the customer information in the vendor computer with previously-stored customer database information; entering the order for further processing in a first manner if the comparing step produces a match between the customer information and the previously-stored customer database information; and entering the order for further processing in a second manner if the comparing step does not produce a match between the customer information and the previously-stored customer database information.

3 Claims, 3 Drawing Sheets

AUTOMATED ORDERING METHOD

BACKGROUND OF THE INVENTION

1. Field Of The Invention

The present invention relates to generally to the field of computerized ordering of a product or service via a communications media. More particularly, the present invention relates to computerized ordering of a product or service via communications media such as telephone lines, local area network (LAN), satellite or generally any media which may carry digital communications data.

2. The Prior Art

Computerized ordering systems and methods are known in the art. Numerous schemes have been proposed for order entry. These schemes implement numerous features. The relevant prior art known to the inventor includes the following United States Patents.

U.S. Pat. No. 4,734,858 discloses a pocket-sized data terminal for placing orders. The consumer is prompted to store his or her order in the send memory of the data terminal. Once an order is entered, it can be reviewed and modified. When the send memory of the data terminal is full or when the consumer is ready to send the order, the data terminal automatically dials a local processing center (LPC) network to transmit the accumulated orders by using a "SEND MEMORY CONTENTS" command. The LPC verifies the message, returns an appropriate message for visual display at the terminal (either an immediate visual confirmation or an error response) and processes the order to suppliers of the requested goods or services. If there are no errors in the order, the message transmitted by the local center for display on the data terminal is "RECEIVED". This system may be most readily understood by an examination of FIGS. 1, 3–7, 10, 14 and 17 and columns 1–4, 7, 8 and 10.

U.S. Pat. No. 5,117,354 discloses an automated system for pricing and ordering manufactured goods. Software is included in the system to allow the user to place an order on his personal computer using a series of menus the order is saved on disk, and the completed order is then transmitted via electronic mail to the host computer. The host computer polls the electronic mail for communications and either prices the quote or processes the order. The user can receive a priced quote file in his electronic mailbox from the host. The file contains the items and product identification numbers, complete pricing and discount information. The host receives the order, assigns the order an order number, and sends the order number back to the user for confirmation. The host can send either a hard copy or an electronic copy via the electronic mail link. This system may be most readily understood by an examination of FIGS. 2A–2C and 3, columns 2, 4, 5, 9 and 10.

U.S. Pat. No. 5,237,499 discloses a computer travel planning system. A user plans an itinerary using a format screen and additional pop-up menus on a personal computer. After verification by the user, this information is then stored in a temporary file for transmission via telephone lines/modem to a central processing unit. The central processing unit controls the accessing of various travel databases to make reservations for airlines, hotels, car rentals, etc. If an error is encountered at any step of the reservation process, an error message is formatted and returned to the originator (user). Once a firm booking is made, a response message is returned to the user that includes flight information, hotel information, car rental information, seat assignments, and delivery information (FIG. 4). Confirmation numbers are given for both the hotel information and the car information. Actual printing and delivery of the ticket may be performed by incorporating a dedicated printer into the system. This system may be most readily understood by an examination of FIGS. 1, 3 and 4 and columns 2 and 5–7. The patent does not disclose writing the response message into the original temporary file.

U.S. Pat. No. 4,891,503 discloses a distributed authorization system. A host computer authorizes transactions from a plurality of remote terminals. The host computer can deny the request, authorize the request or establish an electronic connection between the host and a terminal. During connection, the host updates the terminals authorization file with account data.

U.S. Pat. No. 4,947,028 discloses an automated order and payment system where the user places his order for products or services at an order computer terminal. The terminal sends this data to a central computer system where the order is verified and the user's credit worthiness is checked. If the product or service is available and the user's credit is worthy, an order verification signal is sent to the user's order computer terminal for user verification. The user then orders the product or service.

U.S. Pat. No. 5,241,466 discloses a central depository system for administering wills and other associated information. The depository includes a computer and a write once, read many (WORM) drive CD-ROM player connected to an optical scanner. The documents are scanned by the optical scanner for storage on the CD-ROM player. Requests for information located at the depository can be received from remote locations by data transmission devices such as telephone, facsimile, postal service, or electronic mail. The requested information or documents are then transmitted via the appropriate transmitting device to the person making the original request. Billing systems are utilized to charge appropriate fees for the services. This system may be most readily understood by an examination of FIGS. 1–4 and 6. The reference does not disclose confirmation files.

U.S. Pat. Nos. 4,959,686, 4,972,318 and 4,984,155 disclose order entry systems that use a personal computer to allow a user to obtain catalog or shopping assistance for a product and/or to order a product.

U.S. Pat. No. 4,964,043 discloses a system for ordering gear configurations comprising a host computer and a plurality of dedicated terminals that communicate with the host via telephone lines. The system guides the user through a sequence of inquiries/menus, the input data is transmitted to the host computer and result data received from the host computer is displayed for confirmation or rejection by the user. This system may be most readily understood by an examination of columns 2–4 and 7.

U.S. Pat. No. 4,975,841 discloses a method and apparatus for automatically contacting customers and reporting customer order status data. Product order information, scheduled and actual shipping dates and the customer's phone number are included in a customer report file. This file is automatically transmitted by facsimile from the main frame computer system to the identified customer. This system may be most readily understood by an examination of FIGS. 1–3 and columns 2–4.

U.S. Pat. No. 4,992,940 discloses an automated system that allows users to receive information about goods or services and/or to directly order goods or services. The user indicates the service or good desired using menus on a local computer that is linked to a central database. The database is searched and the requested information about the service or good is transmitted back to the user. The user can then select items for immediate purchase, and the system automatically transmits the order to the appropriate vendor. This system may be most readily understood by an examination of FIGS. 2A, 2B, 3, 4, 6 and 7.

U.S. Pat. No. 5,230,048 discloses a multi-user system for transferring data from a remote database to individual subscribers. Configuration files are used to store customer access information. A primary provider task includes conventional communications software for transferring and receiving data along telephone lines.

U.S. Pat. No. 5,003,472 discloses an order entry system for restaurants. Orders are entered on remote terminals by either bar code or scanning and are then sent to a host computer for processing. Portable terminals located at the cooks' station are used to display the order.

U.S. Pat. No. 5,103,079 discloses providing goods or services in response to a memory card being presented at a local terminal. The local terminal sends the request to a computer center. Results at the computer center are transmitted back to the local terminal.

U.S. Pat. No. 5,179,660 discloses a computer network that serializes order related requests into a single transmission message. The local node gathers any information required from the user and transmits the information to the remote location. The remote location obtains the requested results and transmits these results back to the user. Multiple database access requests can be performed using only two communication messages.

While there are a variety of features available in these prior-art order-entry systems, there is room for improvement in the functionality and versatility of such systems.

BRIEF DESCRIPTION OF THE INVENTION

According to the present invention, a computerized ordering system allows one or more users at remote locations to place orders for goods or services with a central computer. Moreover, the system allows users to compose their orders prior to calling the central computer, thus minimizing telephone expenses. Instead, the user enters a request for the goods or services desired at their own remote computer terminal. The user may then view the composed order to verify it prior to sending it to the central computer.

Following this order entry session, the user initiates transmission of the order to the distant central ordering vendor computer via a communications medium such as modem or facsimile transmission. The customer transmits at least the order and customer information identifying the customer to the vendor computer.

The vendor computer verifying the order and transmits a job number to the customer computer. The vendor computer also compares the customer information with previously-stored customer database information to determine if the customer is a previous customer. If a match with a customer in the database is found, the order is entered for further processing in a first manner, such as a more automated processing procedure. If no match is found, the order is processed in a second manner, and may include further steps such as early ordering personnel intervention and attention appropriate to new customers. As presently preferred, this comparison step may include several steps, such as comparing a customer name field in the customer information with customer name information in the database; comparing a customer address field in the customer information with customer address information in the database; and comparing a customer telephone number field in the customer information with customer telephone number information in the database. A match is indicated only if all three comparison steps are successful. In this manner, customers with more than one facility may be better served, and address errors corrected prior to shipment of goods to the customer.

If the customer is not found in the existing database, an additional step may be employed to add the customer information into the database.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

According to the method of the present invention, the customer utilizes a typical computer such as an IBM compatible PC and installs software which enables the computer to communicate with a centrally located vendor computer to which any customer may connect via customary communications media, such as modems connected through telephone lines, etc. The software is configured to implement the method of the present invention, although those of ordinary skill in the art will recognize that a dedicated hardware state machine, etc, could be used instead. From the disclosure herein, any person of ordinary skill in the art could easily compose a software program to implement the disclosed method.

Figure 1A:
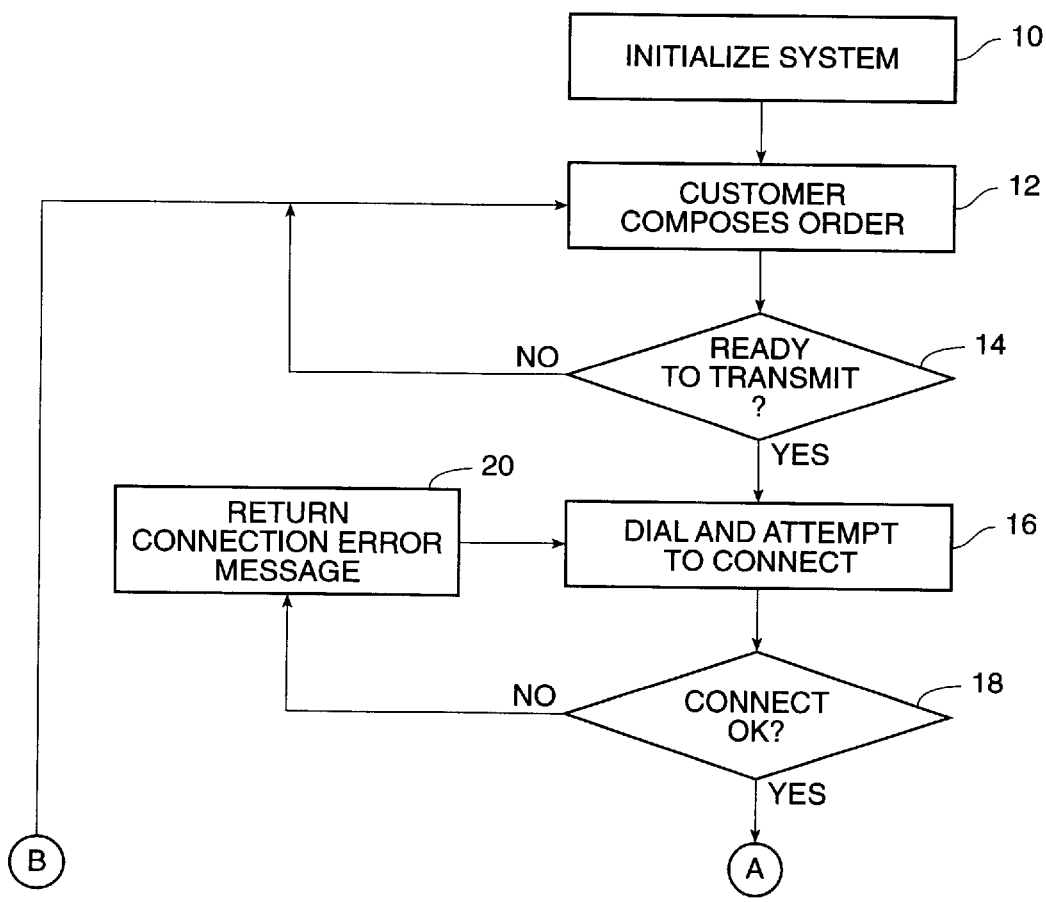
FIGS. 1a and 1b together comprise a flow diagram of a presently preferred embodiment of the method of the present invention.
Figure 1B:
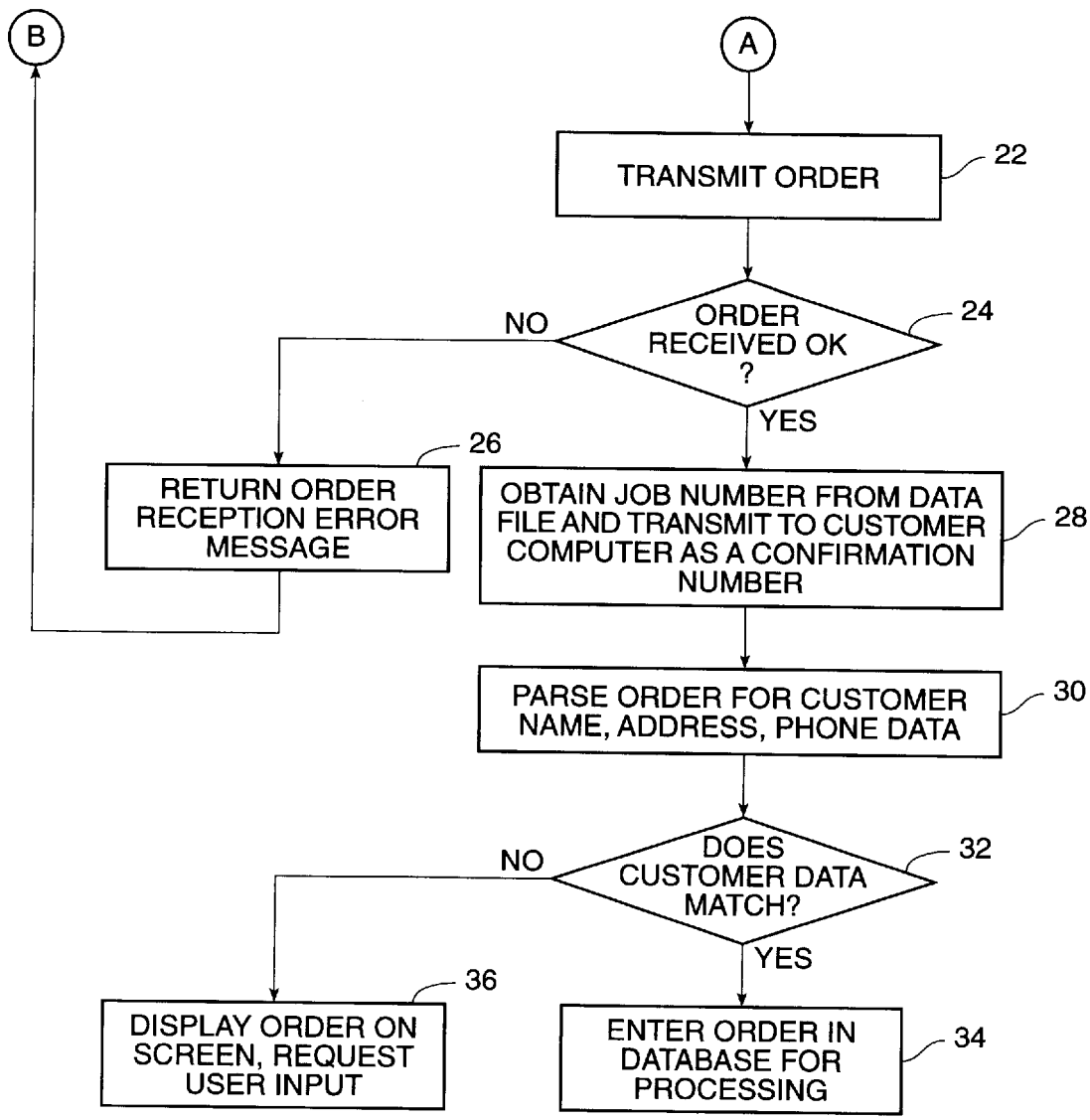

A flow diagram of a presently-preferred embodiment of the method of the present invention is presented in FIGS. 1a and 1b. Those of ordinary skill in the art will recognize that variations of the flow diagram of FIGS. 1a and 1b are possible without departing from the concepts of the present invention.

According to the method of the present invention, the customer composes an order off-line and then connects to the vendor computer to place the order. Before entering any orders, the customer is prompted to enter some initial system setup information. Referring first to FIG. 1a, the system configuration and initialization is shown symbolically at step 10. Such information as the customer name, address, phone number and modem setup may be entered at this time. As will be further disclosed herein, this information is used by the vendor computer for error correction, new customer entry, and servicing customers having more than one facility from which orders are placed. Those of ordinary skill in the art will recognize that initialization step 10 need only be performed once when the software is loaded into the customer computer.

As is customary with computer communications setup, the modem setup information necessary to configure the computer to communicate with a remote modem at the vendor computer must be entered prior to transmission of the order and is also input during INITIALIZATION step 10. As will be appreciated by those of ordinary skill in the art, such configuration information includes the identity of the communications port that the modem is using, telephone number to dial, communications protocol information, etc. Known user interface software modules may be used for entry of such information.

When the customer desires to place an order, the ordering method of the present invention allows order compilation to be performed at the customer's location before actual connection to the service computer is made. This step is shown symbolically at step 12. Employing this step off-line minimizes the time that the customer's computer and the central vendor computer are connected by telephone line, thus saving telephone connection charges. Also, since reception of incoming orders requires approximately 10–15 seconds, the number of modems at the service computer is minimized. If a customer's computer encounters a busy signal while trying to connect with the service computer, the software attempts to redial one or more times until connection is finally made.

The actual order entered into the customer's computer can consist of an initial menu from which the customer can choose the type of service or product desired. In an embodiment of the present invention relating to providing patent and related documents to a plurality of users, examples of menu choices are shown below:

1) Patent Copies
2) File Histories
3) Trademark Search
4) Miscellaneous Service

Once the customer chooses a service/product, a window opens with blocks for allowing specific items, such as patent numbers, or other product stock numbers, etc., under the selected general category to be ordered. The customer can then continue to enter items until all have been entered. Upon requesting that the order be transmitted, the customer may also be requested to input what type of delivery service is requested. Some examples include facsimile, overnight courier services, regular mail etc. This step, and other steps depending on the nature of the transaction to be transmitted, are indicated in step 14.

After the order entry is completed, the customer may review the order to check for errors and completeness. The customer is then ready to request that the order be transmitted to the service computer.

The customer may then instruct its computer to attempt to dial the vendor computer to make a connection. This is shown as a yes response to the quaere in step 14 and the performance of step 16. If a successful connection is made, the method proceeds to step 18 where the order is transmitted to the service computer. If the dial attempt fails the method proceeds to step 20, where an error message is generated.

The system may also attempt to redial one or more time as is known in the art and indicated by the return from step 20 to step 18. The number of redial attempts may be fixed or may be a user-entered parameter defined at initialization.

If the communications connection has been made successfully at step 18, the order is transmitted to the vendor computer at step 22. In addition to transmission of the order data, step 22 includes transmission of the customer name, address, and telephone number to the central vendor computer for later use as will be further disclosed herein.

At step 24, the order is examined to see if it is valid. This step may comprise determining whether stock numbers or other identifying information are valid, etc. If errors are detected, an order-reception error message is generated and sent to the customer computer at step 26.

When the order is verified as error-free by the service computer at step 24, a job number is assigned to it by the vendor computer as indicated in step 28. This job number represents the next sequential job that the service computer will be processing. This order number is typically read from a file which contains job numbers which are incremented each time a new job is assigned. This job number is then transmitted back to the customer's computer as a confirmation number and is stored within the customer's computer as a confirmation file.

This confirmation number allows the customer to track its order more readily, since this number is used by the service center to process the order. This confirmation number may be barcoded onto or otherwise associated with the order so that the order can be continually tracked as it moves through the service center. The confirmation number also informs the customer that the order has been received and is being processed.

To further automate order servicing, the method of the present invention parses incoming orders at step 30 and, at step 32 compares the customer name, address and telephone number sent with the order against a database maintained in the vendor computer. These steps in the present method allow several decisions to be made.

First, this step allows the vendor computer to determine if the incoming order is from a known previous customer. One method to determine this is to compare the incoming Company name to a database stored at the service computer. In a similar fashion, the phone number, address etc. can be compared to see if they match those of known existing customers.

Second, since some customers have numerous offices in different cities, this step may comprise a check for at least the match of 2 or 3 of the name, address, and telephone number criteria to ensure that the incoming order is from a known customer, and, if so, to identify which of a plurality of different ordering facilities of a customer has initiated the order. If all match, then at step 34 the order is entered into the ordering database for immediate processing.

Third, if the matching of the customer information with information already in the database fails, the customer either does not appear to be a known one, or has changed its address, telephone, number, or both, or has added a new ordering facility. In such a case, the method proceeds to step 36, where the incoming order is flagged for special handling. The order can be stored in a temporary file or alternatively be displayed on a display screen to allow order servicing personnel to view it. At this point the service personnel can request that the new customer be added to the database. In a variation of the present method, the new customer information may be automatically entered into the database.

Alternatively, the service personnel may determine that the order is from a known client but contains one or more errors, e.g., the information in the order has been mistyped, or the customer has moved or added a new facility. In this case, the correct information can be entered, the order entered into the ordering database and may be processed.

According to another feature of the present invention, one or more vendor information files are created in the consumer computer during the initialization step. Each time that the customer connects to the central vendor computer to place an order, it sends information to the central vendor computer identifying the version of the files stored in the customer computer. The central vendor computer examines the version information and can download a new version of the information files if the version is not the current version stored in the central vendor computer.

This feature of the present invention allows such information as price schedule, recent ordering and inventory information, availability of services, and virtually any kind of advertising information to be currently available in the customer computer without the need for the customer to go on line for the specific purpose of receiving the information.

The information file may be viewed by the customer at any time by selecting a menu choice such as "View Recent Price Changes" or the like from the customer computer. This feature of the present invention allows the customer to have constant access to the most recent prices, availability of services and products offered by the vendor, and thus allows the customer to make better decisions concerning whether to purchase particular products or services.

Figure 2:
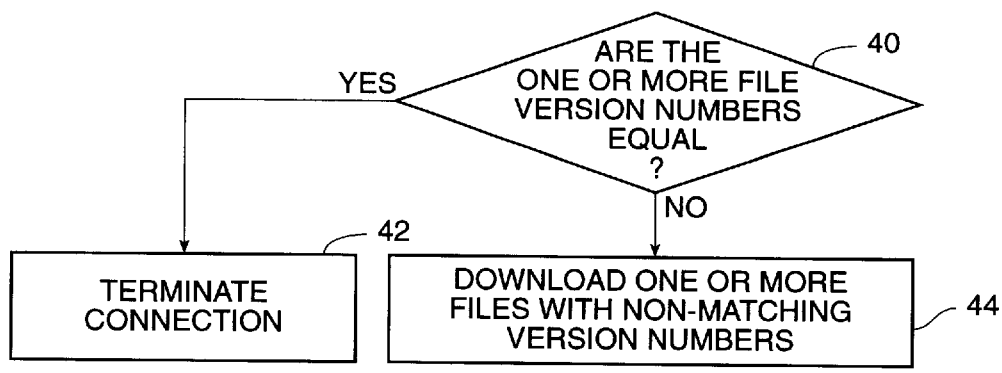
FIG. 2 is a flow diagram describing the vendor information file updating feature of the present invention.

Referring now to FIG. 2, a flow diagram illustrates the operation of this feature of the present invention. The portion of the method of the present invention described in FIGS. 1a and 1b operates as disclosed above, with the additional step of transmitting data identifying the version of the one or more vendor information files to the central vendor computer. This may be done at the same time that the customer name, address and telephone number information is transmitted to the central vendor computer in step 22 of FIG. 1b.

Step 40 is preferably performed after the order is taken and confirmed and thus proceeds from whichever one of steps 34 or 36 is performed in the method of FIG. 1b, although those of ordinary skill in the art will recognize that the order in which the process of FIGS. 1b and 2 are performed is somewhat arbitrary. In step 40, the version numbers of the one or more vendor information files sent by the customer computer is compared with the version numbers of the one or more current versions of the corresponding vendor information files resident in the central vendor computer. If the version numbers are equal, the method proceeds to step 42, in which the connection is terminated. Those of ordinary skill in the art will recognize that, if the method disclosed with reference to FIG. 2 is performed prior to the method disclosed in FIG. 1b, processing would jump to step 22 of FIG. 1b at this point in time and the connection would terminate after whichever one of steps 34 or 36 is performed in the method of FIG. 1b.

If the version numbers of the one or more vendor identification files sent by the customer computer do not match the version numbers resident in the central vendor computer, at step 44 the central vendor computer downloads to the customer the current versions of the ones of the one or more files whose version numbers do not match the current resident versions.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for automated ordering by a customer at a remote location to a vendor in a central location, comprising the steps of:

composing an order at the remote location and entering said order into a customer computer;

initiating a connection between said customer computer and a vendor computer at said central location across a communications media after composing said order;

transmitting at least said order and customer information identifying said customer to said vendor computer by said customer computer;

verifying said order in said vendor computer and transmitting a job number from said vendor computer to said customer computer;

comparing said customer information in said vendor computer with previously-stored customer database information;

entering said order for further processing in a first manner if said comparing step produces a match between said customer information and said previously-stored customer database information; and entering said order for further processing in a second manner if said comparing step does not produce a match between said customer information and said previously-stored customer database information.

2. The method of claim 1, further including the step of adding said customer information into said previously-stored customer database information if said comparing step does not produce a match between said customer information and said previously-stored customer database information.

3. The method of claim 1 wherein said step of comparing said customer information in said vendor computer with previously-stored customer database information comprises:

comparing a customer name field in said customer information with customer name information in said previously-stored customer database information;

comparing a customer address field in said customer information with customer address information in said previously-stored customer database information;

comparing a customer telephone number field in said customer information with customer telephone number information in said previously-stored customer database information; and indicating a match if all three comparison steps are successful.

* * * * *